United States Patent [19]

Berni

[11] Patent Number: 5,070,483
[45] Date of Patent: Dec. 3, 1991

[54] REMOTE SEISMIC SENSING

[75] Inventor: Albert J. Berni, Houston, Tex.

[73] Assignee: Shell Oil Company, Houston, Tex.

[21] Appl. No.: 464,041

[22] Filed: Jan. 12, 1990

[51] Int. Cl.$^5$ .................. G01V 1/24; G01B 9/02; G01P 3/36

[52] U.S. Cl. .................... 367/14; 356/349; 356/28.5

[58] Field of Search ............ 367/14, 15, 149; 356/28.5, 345, 349

[56] References Cited

U.S. PATENT DOCUMENTS

| | | | |
|---|---|---|---|
| 3,409,369 | 4/1964 | Bickel | 88/1 |
| 3,604,804 | 9/1971 | Penney et al. | 356/28 |
| 4,277,167 | 7/1981 | Eppel | 356/5 |
| 4,284,350 | 8/1981 | Coon et al. | 356/28.5 |
| 4,551,018 | 11/1985 | Menneve et al. | 356/28.5 |
| 4,583,095 | 4/1986 | Peterson | 342/22 |
| 4,818,100 | 4/1989 | Breen | 356/5 |
| 4,834,111 | 5/1989 | Khanna et al. | 128/774 |
| 4,843,597 | 6/1989 | Gjessing et al. | 367/15 |

OTHER PUBLICATIONS

"Exploratory Research by General Research of Interest to EP Sectors", Biweekly Newspaper, The Royal Shell Exploration & Production Lab., vol. 32, No. 17, Oct. 12, 1984, (translation attached hereto).

Primary Examiner—Ian J. Lobo

[57] ABSTRACT

Methods and apparatus are provided for sensing motions of the earth caused by seismic waves from the doppler shift of reflected electromagnetic waves. The apparatus is based on a heterodyne continuous wave laser system.

9 Claims, 6 Drawing Sheets

REMOTE SEISMIC SENSING

BACKGROUND OF THE INVENTION

The present invention relates to exploration seismic surveying, and more particularly, relates to remotely detecting motions of the earth that are detected through the use of electromagnetic waves.

It is generally the objective of seismic exploration to generate seismic energy, make measurements of and record the amplitude of any reflected and refracted energy at selected locations and for selected times, and then by selectively processing the recorded seismic data, to deduce the geometry of the subsurface geologic boundaries as well as some of the properties of the materials of the earth through which the seismic energy has propagated and from which it has been reflected.

Conventional land seismic acquisition techniques involve the use of an appropriate source (dynamite, vibrator(s), airguns(s), etc.) to generate seismic energy and a set of receivers, spread out on the surface of the earth, to detect any seismic signals due to seismic energy interacting with subsurface geologic boundaries. These detected signals are recorded as a function of time and subsequent processing of these signals, i.e., seismic "traces" or seismic data, is designed to reconstruct an appropriate image of the geologic boundaries of the subsurface and to obtain information about the subsurface materials. In simplistic terms, this conventional acquisition process has a seismic wave, from a source of seismic energy, travelling down into the earth, reflecting from a particular geologic interface (i.e. a change or contrast in elastic constants, velocities, and/or densities), and returning to the surface, where the seismic wave may be detected by an appropriate receiver, or receivers.

Conventionally, the receiver employed to detect seismic signals on land is a geophone. A geophone is an electro-mechanical device that is coupled to the ground via an extension or "spike" that is physically inserted into the ground. This allows the geophone case to vibrate as a result of any earth motions, including seismic signals. Internal to the geophone case and vibrationally isolated from the case (typically by springs) is an "inertial" mass that does not vibrate with the earth. Thus, there is a small relative motion between the geophone case and its inertial mass due to any detected ground motions. This relative motion is converted to an electrical signal by having a coil of wires move through an electromagnetic field from a permanent magnet; the magnet may be the inertial mass with the coil attached to the geophone case, or vice versa. This electrical signal is the seismic signal that is recorded and later processed.

In general, seismic field layouts vary with the exploration objective sought to be detected. However, there is almost always a need to simultaneously record seismic motion at many ground positions spaced over a wide area. Conventional 2-D acquisition is usually limited to shot ("seismic energy source") locations and receiver locations with maximum spacings therebetween ("offsets") of about 10,000 m along a given survey line. A seismic line usually consists of multiple detector stations with each detector station made up of several detectors. The detectors are grouped together and connected so as to reject unwanted waves while enhancing the reception of desired seismic waves. The distance between stations is usually 25 to 50 m to allow for adequate spatial resolution of the subsurface geologic boundaries.

The signals from these arrays of detector stations are collected and recorded for each seismic shot (seismic energy source). A wavelet emitted for a seismic shot is usually a pulse of about 30 milliseconds (ms). Depending upon the depth of the layer of the subsurface from which they are reflected, received wavelets have lengths of 60-250 ms. The frequency spectrum of a received wavelet is typically limited at high frequencies, since the earth's absorption increases with frequency. The lower end of the frequency spectrum of a received wavelet is usually determined by detector sensitivity. Geophones have a natural vibration frequency at about 5-8 Hz but are damped to avoid any natural resonance at this frequency; this damping usually precludes acquiring seismic data below about 10 Hz. Thus, the normal operational seismic range is typically about 10-80 Hz.

The signal strength of the received wavelets measured with a geophone decreases with time after each shot until the signal reaches noise level, after which the wavelets cannot be identified anymore. The initial reflected signal level is typically a few hundred millivolts, while noise level is usually a few tens of microvolts (these voltages are rms values); the signal-to-noise ratio (SNR) runs from about 70 db (initial reflected signal) to 0 db (detection limit), with anything greater than about 30 db representing good signal quality.

Figure 1:
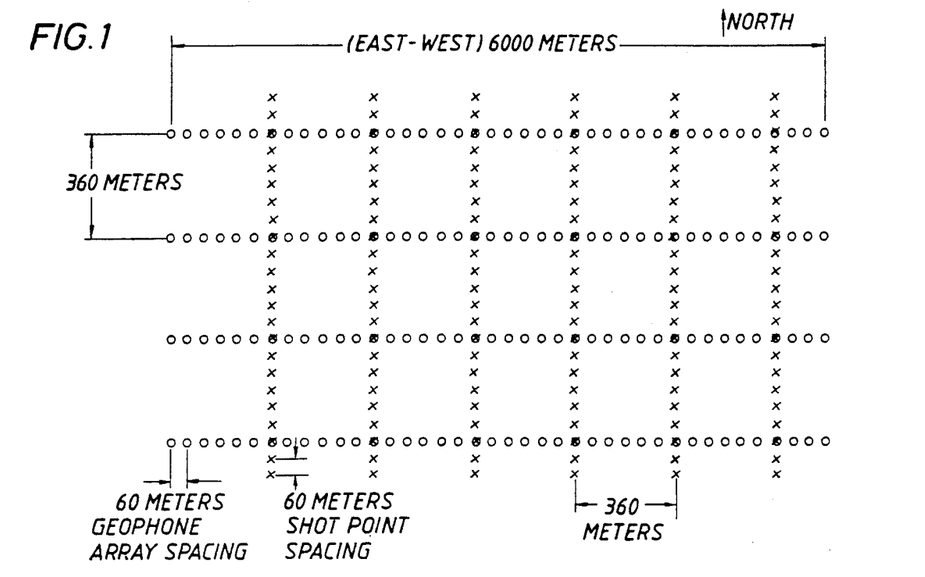
FIG. 1 depicts the general arrangement and layout of receivers and sources for a conventional 3-D land seismic survey.

In a conventional hypothetical land 3-D survey, shown in FIG. 1, each E-W line spans 6000 m with 60 m spacing intervals between each station (or array center) location along an E-W line. Four parallel lines, offset by 360 m N-S, are used simultaneously in this hypothetical example. This requires 400 active recording channels. After acquiring seismic data for several days, the bottom two E-W lines are each leapfrogged 1440 m to the North and the process is repeated until the detector spread has progressed the desired distance, i.e. covered the area of interest.

Such conventional land seismic data acquisition is slow, expensive and labor intensive. In particular, the activities of installing and then later removing the receivers or geophones is slow and labor intensive. The rapid expansion of 3-D acquisition, where many more source locations and many more receiver locations are used, puts even greater emphasis on developing more cost effective methods for receiving seismic signals.

It would be desirable to have many more channels so that finer spatial sampling and longer offsets in the N-S direction could be obtained during the activation of one seismic source, which may be, for example dynamite, vibrators, or air guns. It would also be desirable to have a fast way to move the entire detector spread or portions thereof and thereby minimize survey time.

Remote sensing of seismic vibrations is one potential solution for reducing the cost and time for acquiring seismic data. Remote sensing could be performed from an airborne platform at some height above the earth area sought to be seismically surveyed.

However, conditions on the surface of the earth for remotely detecting seismic vibrations are quite different from most other remote detection conditions. More particularly, the minimum particle velocities associated with the seismic vibration amplitudes to be measured are very small ($10^{-9}$ m/sec) and the natural reflectivity of the earth's surface is highly variable and is low in many cases. In addition to the desired seismic vibrations, the earth's surface also undergoes other types of vibrations. Further, the power of any radiation directed from an airborne platform to the ground must be limited in order to prevent eye damage to animals or people who look up at the radiation source. In addition, the height of the detecting platform is high to ensure adequate coverage of a large detection (survey) area. Finally, any detection scheme should also have a linear response over a wide range of seismic amplitudes.

U.S. Pat. No. 4,834,111 to Khanna et al discloses a heterodyne interferometer for measuring low vibration amplitudes of objects having low reflectivities; this heterodyne interferometer is principally for measuring inner or middle ear vibrations. Further, remote sensing vibration measurement equipment are commercially available. However, such equipment have a limited detection distance range (order of tens of meters) and use a very small target area (usually determined by a focused beam and having an approximate diameter of 50 to 100 micrometers). Such vibration measurement equipment are usually based upon laser doppler interferometry.

Rugged and transportable laser doppler interferometer equipment have been developed for measuring wind velocities (wind shear) in front of aircraft and adjacent to airport runways. However, wind velocities are several orders of magnitude larger than seismic velocities (m/sec versus μm/sec). These wind measuring systems have detection distance ranges of up to hundreds of meters and also use focused beams.

However, such known equipment are not well suited for remote seismic sensing. The single, focused, small spot is very sensitive to intensity variations from beam interruption and deflection, as well as local variations in spot reflectivity because of small beam movements at large distances. These intensity variations may cause a loss of signal.

These and other limitations and disadvantages of the prior art are overcome by the present invention, however, and new, improved methods and apparatus are provided for acquiring seismic signals with remote detection techniques which allow for faster seismic surveys.

SUMMARY OF THE INVENTION

In a preferred embodiment of the present invention, methods and apparatus are provided for remotely sensing seismic vibrations of the earth's surface. The methods of the present invention illuminate with electromagnetic radiation those portions of the earth where seismic signals are desired to be sensed and determine such seismic signals from detected electromagnetic radiation reflected from said illuminated portions of the earth. More particularly, the methods of the present invention use a continuous wave (CW) or pulsed laser beam to illuminate a portion of the earth and determine seismic signals from the doppler shift of the detected, reflected laser beam. The methods also include employing time-of-flight measurements to obtain ground elevation data for those illuminated portions of the earth. The apparatus of the present invention is based on a laser doppler interferometer using heterodyne techniques to detect seismic signals.

It is an object of the present invention to provide methods and apparatus for remotely sensing seismic signals.

It is an object of the present invention to provide methods and apparatus for remotely sensing seismic signals using reflected electromagnetic waves.

It is an object of the present invention to provide methods and apparatus for performing land exploration seismic surveys.

These and other objects of the present invention will become apparent from the following detailed description, wherein reference is made to the Figures in the accompanying drawings.

DETAILED DESCRIPTION OF THE INVENTION

In a preferred embodiment of the present invention, methods and apparatus are provided for remotely sensing seismic vibrations at the earth's surface. The methods of the present invention use a continuous wave (CW) or pulsed laser beam to illuminate those portions of the earth where seismic signals are desired to be detected. The detected, reflected laser beam is doppler shifted by any earth motions and the methods of the present invention determine this doppler shift using various heterodyne interferometry techniques. The methods of the present invention may also employ time-of-flight measurements to obtain ground elevation data in addition to the seismic signals; preferably a laser beam is modulated (AM and/or FM) for any time-of-flight measurements. The apparatus of the present invention is based on a laser doppler interferometer employing heterodyne techniques to detect seismic signals. Preferably, the apparatus is an airborne system based on a laser doppler interferometer that employs the methods of the present invention. The airborne system may be employed on any type of airplane, helicopter, balloon, or any other type of above-ground mobile platform. However, portions of the airborne system, such as, for example, but not limited to, the laser and its associated power supply and cooling system, may be located at the surface of the earth, as described more fully later herein. The term "seismic signal" is used herein (in either singular or plural form) to mean motions of the earth's surface (land or water) induced by seismic waves, whether those seismic waves are created artificially or naturally. The term "seismic velocity" is used herein (in either singular or plural form) to mean the velocity of motions of the earth's surface (land or water) induced by seismic waves, whether those seismic waves are created artificially or naturally.

The airborne system of the present invention can remotely sense seismic ground motion and should yield large cost reductions for land data acquisition. With the apparatus and methods of the present invention, moving a seismic land detector group will be as easy as moving the detectors in a marine streamer cable in the marine environment. In its simplest embodiment, such remote sensing is accomplished by illuminating at least those portions of the ground where seismic signals are sought to be detected with a substantially monochromatic laser beam. In general, any wave reflected from a moving object has a frequency shift caused by the doppler effect; this shift in frequency is proportional to the velocity component of the moving object along the line of sight of the laser beam. Thus, any detected, reflected laser beam is doppler shifted by any ground motion, i.e., the return signal's frequency shift is proportional to the particle velocity at the ground's surface. Both the sender and receiver may be large distances from the earth's surface, and may be at different spatial locations. Various heterodyne methods may be used to detect the doppler frequency and after frequency demodulation obtain a signal equivalent to that obtained from a geophone. In summary, remote seismic data acquisition involves detection of the reflected waves and their associated doppler shifts followed by frequency demodulation to extract the seismic velocities represented by the doppler shifts. Thus, any subsequent processing and interpretation of these signals should be similar to conventional processing and interpretation of geophone signals. Time-of-flight measurements using a modulated laser beam from the airborne system of the present invention may also be used to obtain data on the elevation of the reflecting surface at the ground sensing locations.

The airborne laser system of the present invention operating at an elevation of 1000 m may sample the ground every 4 m and then sum the signals from 16 such locations together at every 60 m interval over a square area 900 m on a side. Each summed signal represents a recorded "channel" signal. The desire to obtain good vertical ground motion signals, even when projected onto the laser's line-of-sight path at the "edge" of the square dictate the maximum size of the data acquisition square for a particular height above the earth of the airborne system. The cosine of the angle from the vertical to the laser path is selected to be no less than 0.8 at the "edge" of the square to ensure good vertical ground motion signals; however, values of cosine other than 0.8 may be employed (for example, for 3 component detection as described later herein), and other shapes other than a "square" of acquisition area may be employed in the methods and apparatus of the present invention. Such an interval (60 m) and square area (900 m)$^2$ requires 225 channels for the laser system. Six such laser systems would be needed to simultaneously perform the hypothetical 3-D survey of FIG. 1 described hereinbefore. The survey could also be performed faster and with a finer spatial sampling than conventionally. Thirty six such airborne systems totaling 8100 channels could simultaneously record a 5400 by 5400 m survey with data taken every 60 m (i.e. data equivalent to single geophones at a 4 m spacing).

The total area of a desired survey is divided up into smaller parts. Each part must then be illuminated over an area covering sufficient dimension that seismic data collected from each part is representative of the seismic motions for that part. An area or spot of about 0.5 m in diameter should be sufficient to replace a single geophone. Alternatively, a larger or smaller area may be illuminated, as discussed later herein. A receiver at some distant point from the surface detects and records a superposition of waves, each from a slightly different portion of the surface. A one-to-one relationship between spots and receivers is presently preferred; thus, a matrix of receivers is needed to simultaneously image all the detection spots. Alternatively, one beam and receiver may be used to quickly scan between each of the locations where seismic signals are desired to be detected.

The airborne laser system described herein is intended to remotely sense seismic motion. Motion of the earth's or ground's surface causes a continuously shifting frequency (doppler) of the reflected sensing laser beam. The doppler frequency is proportional to the particle velocity of the ground. The preferred method is to use electromagnetic waves reflected from the earth's natural surface. However, the use of reflective surfaces appropriately coupled to the surface of the earth for detection of earth motions are also contemplated and considered part of the present invention. Similarly, "inertial" reflective surfaces (i.e., vibrationally isolated from any earth motions) may also be located at the surface of the earth and employed by the apparatus and methods of the present invention.

The field strength of an acoustic wave or microwave can be directly detected, i.e. its instantaneous value is directly detected and transformed into an electric signal. For acoustic waves and microwaves, any doppler shift is thus directly measurable. Source fluctuations may show up and be misinterpreted as doppler frequency shifts.

For electromagnetic radiation in and near the visible spectrum (including infrared), only intensity may be directly detected, since such radiation frequencies are too high for direct detection. Frequency information (such as doppler shifts) can only be extracted from intensity changes. Frequency differences between two beams from the same source can be transformed into intensity beats by heterodyne interferometric mixing of the two beams. The beat frequency equals the frequency difference between the two beams. Thus, doppler shifts in and near the visible spectrum (including infrared) can be detected by heterodyne interferometric mixing. Further, effective heterodyne interferometric mixing requires that the beams to be mixed be almost parallel and almost completely overlapping at the "point" of mixing and that the beams have the same polarization.

For remote detection, the laser beam is split into a sensing beam (sent to and reflected by the earth, i.e. containing the doppler shift) and a reference beam (having a frequency preshift larger than any expected doppler shift). Coherent mixing of the so-called sensing and reference beams from a laser, a process known as heterodyning (or interferometric mixing), generates an intermediate beat frequency signal, or "carrier", that is frequency modulated by the ground motion doppler.

As noted before, doppler frequency shifts in electromagnetic waves in and near the visible light spectrum (including infrared) can only be detected by interferometric mixing of a sensing and reference beam. At the same time, relative frequency fluctuations between the two beams show up on the beat signal and may be misinterpreted as doppler frequency shifts. Thus, stable sources of electromagnetic radiation, such as lasers, are preferably used. Further, since effective interferometric mixing requires almost parallel overlapping beams of the same polarization, this results in an additional complication for remote seismic sensing, in comparison to the direct field detection of acoustic waves or microwaves.

The progagation velocity of electromagnetic waves and the long distance travelled by the sensing beam must be accounted for when the sensing and reference beams are mixed. Since mixing produces a frequency difference between the two beams, this difference should be sufficiently stable to ensure that any doppler frequency shifts are recognized. To obtain this stability, both beams should be derived from the same source at the same instant. When they are derived from the same source but at different instants, a change in source frequency with time may occur. This change will show up in the mixing term and can be misinterpreted as a doppler frequency shift. Accordingly, it is presently preferred to reduce any such time difference. This may be accomplished by employing an appropriate delay line for the reference beam or by ensuring the sensing and reference beams travel about the same distance (i.e. both travel to and reflect from a target area on the surface of the earth).

To obtain the seismic velocities, the interferometric mixing signal should be demodulated. However, in order to determine the sign of the seismic velocities, the interferometric signal should be centered around some offset frequency; this allows both up-doppler and down-doppler to be determined. To obtain such an offset, the reference or sensing beam (or both) may be given a frequency shift prior to mixing. This may be accomplished by passing the beam through an opto-acoustic cell, called a Bragg cell. This frequency pre-shift yields the desired offset frequency. In addition, two Bragg cells may be employed in series along one beam (preferably the reference beam) to allow for varying the frequency preshift as desired.

A Bragg cell is a piece of glass sustaining a moving density grid (a travelling acoustic wave generated by an oscillator appropriately connected to the glass). This grid diffracts radiation waves in different discrete directions with frequency shifts that are successive multiples of the excitation frequency of the oscillator.

All surface movements will result in a doppler shift of the reflected sensing beam. These movements may be signal (seismic vibrations) or noise. Seismic vibrations may be superimposed on other, possibly large, and perhaps more or less constant movements (e.g., due to wind). Further, the seismic velocities to be measured must give frequency changes that are larger than other, random frequency (and amplitude) changes responsible for linewidth broadening. These random changes may be due to source instabilities and/or disturbances along the optical pathway (e.g., atmospheric conditions and changes). Thus, reasonably coherent radiation, such as from a laser, is preferably used. The reflected and detected radiation will include FM from seismic movements, as well as FM and/or AM as a result of these noises and disturbances.

The lowest detectable doppler frequency shift is that frequency shift which can be distinguished from other frequency fluctuations, such as frequency fluctuations of the source. Thus, any source frequency fluctuations should be less than the minimum doppler frequency shift expected for seismic vibrations. For conventional geophones, seismic vibrations are detected in frequency from about 10–80 Hz (because of geophone bandwidth limitations) and their lowest detectable velocity is set by background noise level in the seismic frequency range. For conventional detection, this noise level is from about 0.05 (rural) to 2 (urban) $\mu$m/sec depending on local site conditions. These lowest detectable velocity levels correspond to doppler shifts of about 0.2 to 8 Hz, for visible light, or 0.01 to 0.4 Hz for infrared.

The seismic velocity signal is extracted from the interferometric signal by frequency demodulation; frequency demodulation transforms a frequency shift into a voltage. This voltage straightforwardly represents the velocity of the target area. Again, in order to determine both positive and negative velocities, the interferometric signal should be centered around some offset frequency that is "offset" sufficiently to include the largest expected doppler shift (based on the largest expected particle velocity due to seismic waves). It is the noise level after frequency demodulation that sets the lower limit for detection of seismic velocities.

The total distance from the sender to various parts of the seismic detection areas and back to the detector are such that the detected radiation has travelled a two-way travel path of 600 to 2,000 m when it arrives at the radiation detector. If no special delay line is used, the reference radiation travels at most a few meters before it arrives at the detector. This results in appreciable delay between the two beams and any frequency stability of the laser source may become a problem; that is, the radiation of the sensing beam is sent out by the laser earlier than that of the reference beam. During the time of travel of the sensing beam, the laser may have slightly changed its frequency; if such a frequency difference results, the interferometric signal may be affected.

The standard measure for the maximum path length difference able to be used in conventional interferometry is the so-called "laser coherence length"; for most commercially available lasers, such laser coherence lengths are only a few meters. Surprisingly, such laser coherence lengths have been found to be unimportant for remote seismic sensing as contemplated by the present invention. For remote seismic sensing applications static fringe patterns are not required, but what is required, is the measurement of the dynamics of the interference pattern; that is, doppler-induced frequency changes have to be detected and any detector must be capable of following the instantaneous fringe movements.

As noted before, the path length of the reference beam may be varied by sending it through a special delay line, formed by either mirrors or fibres. Alternatively, the reference beam may be sent along with the sensing beam to a target area (on the surface of the earth), as described more fully later herein. Preferably, such delay line fibres are single-mode polarization maintaining fibers; the plane of polarization of the reference beam should be optimized to coincide with preferential plane of polarization sustained in the fibre. This may be accomplished by inserting appropriate waveplates (quarter-$\lambda$, half-$\lambda$, etc.—where $\lambda$ is wavelength) between the end of the fibre and the reference beam entry therein. Further, an appropriate microscope objective lens may be used to optimize the influx of radiation into the fiber, depending upon the fibre's core diameter. Alternatively, single-mode fibres or multi-mode fibres may also be employed. If used, such fibres should be "tuned" to the frequency of the radiation employed to remotely sense seismic signals.

However, for such an airborne system, a person or animal may look upward and receive direct laser radiation in the eye. Any such direct exposure to laser radiation should not cause any eye damage. Thus, eye safety is important for most applications of the methods and apparatus of the present invention because the ground's surface will be illuminated from an airborne platform.

Acceptably safe laser power levels are highly dependent on the wavelength of the laser. The lens of the eye focuses visible light, 400–760 nm, onto the retina, causing a large increase of intensity. This increase in intensity, especially for a visible light laser, can result in thermal damage of the retina. Near ultraviolet radiation, 310–400 nm, is known to cause photochemical damage. Near infrared radiation, 760–1400 nm, is also focused and has the additional problem of being invisible. Infrared radiation, >1400 nm is not focused by the eye; indeed it is absorbed at the lens of the eye and is considered relatively safe.

Maximum permissible eye exposure levels used herein are based on levels cited in a textbook. (See, for example "Laser Remote Sensing, Fundamental Applications", by R. M. Measures, John Wiley & Sons, New York, 1984, p. 203). These specifications, in units of energy per square cm are not appropriate for CW laser operation. A maximum intensity specification (watts/cm$^2$) has been calculated using this maximum exposure level for a time of ten seconds (worst case). For visible and near infrared radiation, 1 milliwatt/cm$^2$ is deemed as marginally safe, while for infrared the maximum tolerable level is two orders of magnitude greater, 100 milliwatts/cm$^2$. A reasonable specification for any system is to always have illuminating radiation levels below the values noted above but not higher than necessary for adequate detection.

Figure 2:
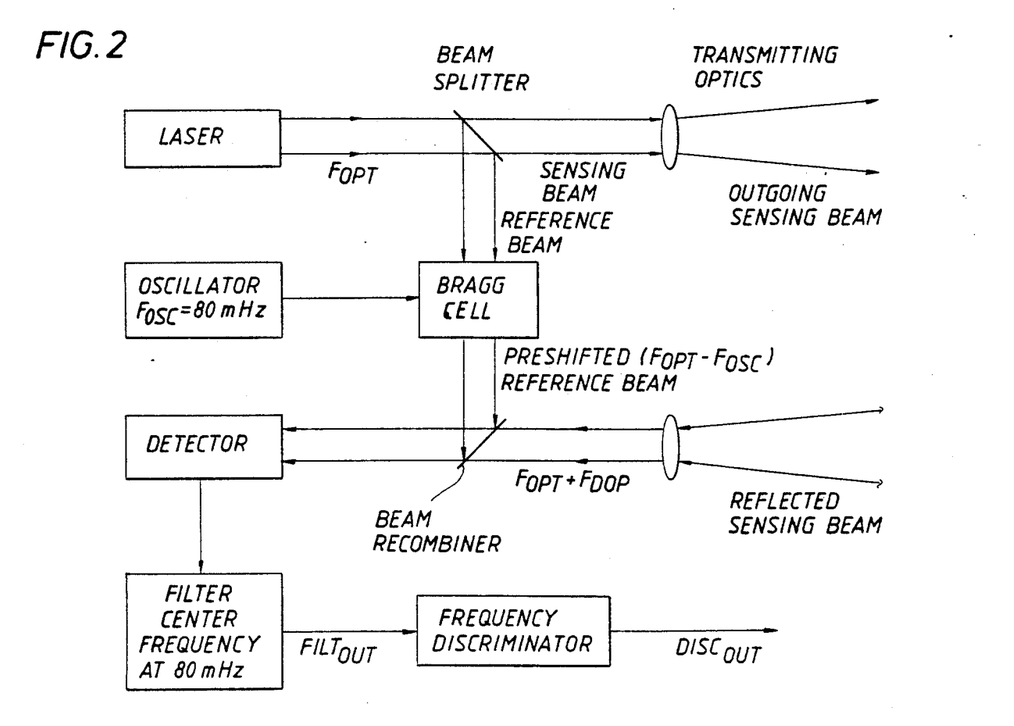
FIG. 2 depicts a simplified block diagram of a laser doppler interferometer as employed by the present invention.
Figure 4:
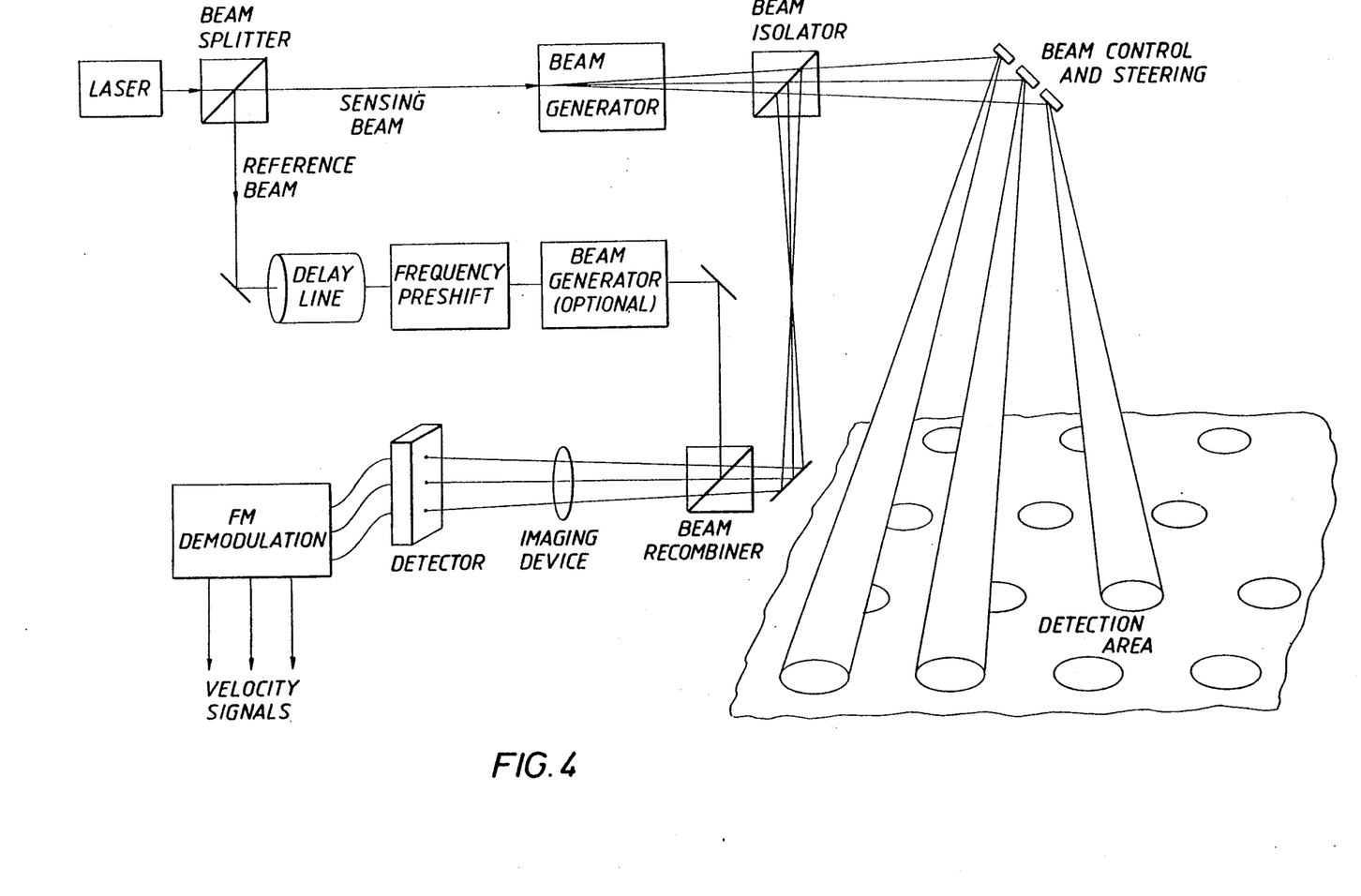
FIG. 4 depicts a simplified block diagram of an airborne laser platform of the present invention, showing multiple detection areas.

For remote detection, the laser beam is preferably split into sensing and reference beams, as depicted in FIG. 2. The outgoing sensing beam and the reflected sensing beam may be parallel beams (as depicted in FIG. 2), or they may be coaxial (and employ the same optics as depicted in FIG. 4). (FIG. 4 is described later herein.) In general, when electromagnetic radiation is reflected from a moving object, it experiences an angular velocity ($2\pi f$) shift equal to the dot product of the velocity vector of the movement and the difference vector between the wave vectors of the transmitted and reflected radiation; the wave vectors lie in the beam propagation direction and have a magnitude of $2\pi/\lambda$. Thus, the field of the reflected radiation is FM (frequency modulated) by the action of the surface movements of the reflecting target area. The sensing beam (SEN) reflects from the ground thereby undergoing a doppler shift due to any ground motion from the portion of the ground illuminated by the transmitted beam and may be written as, $$SEN = A \cos (2\pi F_{rtn}(t)t), \quad (1)$$

with $F_{rtn}(t) = F_{opt}(t-t_r) + F_{dop}(t),$ \quad (2)

and $t_r = 2R/c,$ \quad (3)

where, $F_{opt}$ is the transmitted radiation frequency, which is represented as time varying because the laser frequency is not perfectly constant; $t_r$ represents the delay time or round-trip delay to the ground; $F_{rtn}$ is the reflected radiation's frequency; $F_{dop}$ is the doppler shift, which is represented as time varying because the ground particle velocity may be continuously changing; R is the distance between the laser and target on the ground; $\pi$ is 3.14159; A is the signal's amplitude; c is the speed of light; and t is time. Further, for vertical line-of-sight back-scattering the doppler shift ($F_{dop}$) is caused by any vertical velocity of motion, $$F_{dop}(t) = 2V_d(t)F_{opt}/c, \quad (4)$$

where, $V_d$ is the vertical velocity causing the doppler shift, and c is the speed of light.

The frequency of the reference beam (REF) is preferably deliberately shifted by a fixed frequency that is larger than any expected doppler shift resulting from seismic waves and may be written as, $$REF = B \cos (2\pi F_{ref}(t)t), \quad (5)$$

with $F_{ref}(t) = F_{opt}(t) - F_{osc}, \quad (6)$ where, $F_{ref}$ is the shifted reference beam frequency, $F_{osc}$ is a fixed frequency shift (preshift), and B is the signal's amplitude. Such a preshift may be, for example, 80 MHz, or any other convenient frequency sufficient to cover the expected doppler shifts.

Both the reflected sensing and reference beam are appropriately recombined optically and projected onto a detector. The mixing process can be visualized as the formation of interference fringes resulting from alternate constructive and destructive interference between the two waves at the detector location. Vibration detection consists of the detection of changes in the interference fringe pattern due to changes in frequency. The detector is a square law (quadratic) device so its output consists of various components (or terms) associated with the intensity of the sensing beam, the intensity of the reference beam and a mixed sensing/reference beam intensity. Interferometric mixing of the reflected sensing and reference beam results in a detector current in which the frequency (phase) difference between the sensing and reference beams, as well as the amplitude product of both beams, appears, along with other terms that are not of interest.

In simplistic terms, the detector current is proportional to the instantaneous intensity, I, which is given by, $$I = SEN^2 + REF^2 + 2SEN.REF + \text{Noise} \quad (7)$$

where, $SEN^2$ is the separate modulated intensity of the sensing beam and $REF^2$ is the separate modulated intensity of the reference beam. The 2 SEN.REF term is proportional to $$2\epsilon(AB) \cos [F_{osc}t + \theta(t)] \quad (8)$$

where, $\epsilon$ is an efficiency coefficient, $F_{osc}$ is the frequency preshift which moves this term away from the modulated near DC terms of SEN$^2$ and REF$^2$, $\theta(t)$ is the total phase shift, $\phi_D(t)$ is the doppler phase (where $\phi_D(t) = \int F_{dop}(t) \, dt$), and $\phi(t)$ is a random phase. The strength of the interferometric term (the cos term) depends upon the individual beam intensities and the efficiency factor ($\epsilon$), which is in turn dependent upon polarization matching and beam overlap between the reflected sensing and reference beams. The random phase $\phi(t)$ contains all the instabilities affecting the beams (laser frequency drift, Bragg cell frequency drift, noise vibrations, and other travel path disturbances). If the two beams do not travel the same path and distance, the impact of these disturbances is a function of the delay.

In general, the detector should be sensitive to the wavelength of the radiation employed, produce a low noise level, and have a sufficiently short response time to enable it to follow the signal changes. Solid state arrays may be employed to detect multiple beams from multiple spots. Further, such arrays may be the front end of a chip containing appropriate detector electronics on a chip behind the array.

The interferometric term's strength may be increased (except as limited by shot noise in the detector) by increasing the intensity of the reference beam; in general the sensing beam intensity is set by eye damage considerations and the reflected intensity will be low due to low reflectivity. A filter following the detector may be used to select only the difference frequency or interferometric component which is centered at $F_{osc}$. Also present in the output of the detector and/or filter are noise terms; such terms are $N_{sht}$, representing receiver shot noise and $N_{bck}$, representing interfering signals such as sunlight. Shot noise in the detector is due to the discrete charge of electrons, generated either spontaneously (dark current, dark noise) or under the influence of incident radiation (either laser or background).

The output of the filter (FILT$_{out}$) may be written as, $$FILT_{out} = C \cos(2\pi F_{out}(t) \, t) + N_{sht} + N_{bck}, \quad (9)$$

with $$F_{out}(t) = F_{rtn}(t) - F_{ref}(t) \quad (10)$$
$$= F_{osc} + F_{dop}(t) + F_{opt}(t - t_r) - F_{opt}(t). \quad (10')$$

The signal FILT$_{out}$ is the "carrier" of the seismic information. This carrier is frequency modulated by the doppler/seismic signal to be recovered. It is an important requirement for any receiver that a strong carrier to noise ratio be established. The carrier to noise requirements for reflection off the ground's natural surface are discussed later herein. Laser power levels large enough that the reflected sensing beam can overcome the shot and background noise are believed to be achievable. Accordingly, the noise terms, $N_{sht}$ and $N_{bck}$, will be ignored.

Given adequate carrier to noise ratio, the discriminator module, shown in FIG. 2, will successfully recover the frequency signal $F_{out}(t)$. If the laser frequency is steady over the small time interval $t_r$, then the terms involving $F_{opt}$ cancel (see equation 10'). If complete cancellation is not achieved then these terms represent laser frequency instability noise, $N_{lc}(t) = F_{opt}(t - t_r) - F_{opt}(t)$, that is added to the desired signal, $F_{dop}$, at the output of the discriminator (DISC$_{out}$), $$DISC_{out} = F_{dop}(t) + N_{ld}(t) \quad (11)$$
$$= Const \, V_d(t) + N_{ld}(t) \quad (11')$$

where, Const is a constant equal to 2 $F_{opt}/c$.

The signal is carried as a frequency modulation (FM) or phase modulation of the beat term of the detected signal. The means for processing this beat signal may be by phase demodulation or frequency demodulation techniques. Presently preferred is FM-demodulation using standard equipment. FM demodulation must change this frequency modulation into a velocity signal. Phase-locked loop (PLL) demodulators may be used for such demodulation. The PLL must be designed for the expected range of seismic doppler signals with some consideration for a shifting of this range by wind-induced doppler shifts, that might push the signals outside the expected range. The PLL must be linear in this range.

The PLL operates on a preselected frequency and its bandwidth should be such that it passes only the signal spectrum. This may require a central frequency choice for the input signal that is different from the selected radiation beam preshift. In such case, an electronic frequency shifter may be employed, or as noted before the radiation frequency preshift may be changed by the use of two Bragg cells in series. Electronic frequency shifting involves multiplication of the mixing term with an oscillator signal; preferably this oscillator signal is derived by frequency division, from the oscillator driving the Bragg cell. This allows for cancellation of oscillator frequency instabilities, if there are no time delays between triggering of the Bragg cell and signal arrival at the multiplier; such delays may be compensated for by appropriate delay lines.

Laboratory experiments with a calibrated shaker table have shown that velocities as low as 2.3 microns/sec can be detected above the laser frequency instability noise of an Argon ion laser (operating at 514.5 nanometers), equipped with etalons for linewidth reduction. This was achieved with a path length difference (2-way range) of 162 m. The laser frequency instability noise observed was strongest at frequencies above the seismic band. These experiments may have been contaminated by building vibration so the actual laser frequency instability noise may even be lower than observed. As noted before, equalizing the path lengths of the reference and sensing beams by passing the reference beam through an optical fiber is one way to reduce the laser frequency instability noise by decreasing the optical delay, $t_r$. These experiments also demonstrated that the low frequency sensitivity (0–10 Hz) of a laser sensing device was superior to that of a geophone.

The velocity term $V_d(t)$ contains the seismic ground particle velocity. However, vibration of the airborne system in the direction of the beam, will also contribute to this term. Another source of unwanted motion noise is windblown foliage if natural surface reflectance is used. Accordingly, the recovered signal contains the seismic motion $V_p(t)$ and an added noise, $N_m(t)$, due to unwanted motions, $$V_d(t) = V_p(t) + N_m(t). \quad (12)$$

One way to reduce any such system or "platform" noise is to use two beams directed at a target location. One beam is the sensing beam for detecting earth motion and the second beam is the reference beam. However, the reference beam (which also contains any platform motion signal) would be reflected from an inertial mirror, i.e. a mirror that is vibrationally isolated from the earth vibrations. Then any interferometrical mixing of the reference and sensing beams causes a differencing of the reference and sensing beam frequencies and this removes any such platform noise, which is common to both beams. This technique is more fully discussed later herein.

In summary, the airborne laser system described herein is intended to remotely sense seismic ground motion. Motion of the ground's surface causes a continuously shifting frequency (doppler) of the reflected sensing beam. The doppler frequency is proportional to the particle velocity of the ground. Coherent mixing of sensing and reference beams, a process known as heterodyning, generates an intermediate frequency signal or "carrier" that is frequency modulated by the seismic motion. However, obtaining an adequate CNR is a prerequisite to recovering the frequency modulated seismic data.

The following discussion estimates the carrier to noise power ration (CNR). For the case of reflectance off the natural surface of the earth the incident light is modeled as scattering uniformly into the half-space. The equations used to describe this situation have been well studied in the optics literature. Both visible and infrared wavelength receivers will be considered. One purpose is to calculate the power requirement for the simultaneous operation of 225 seismic receiver stations (channels).

Figure 3:
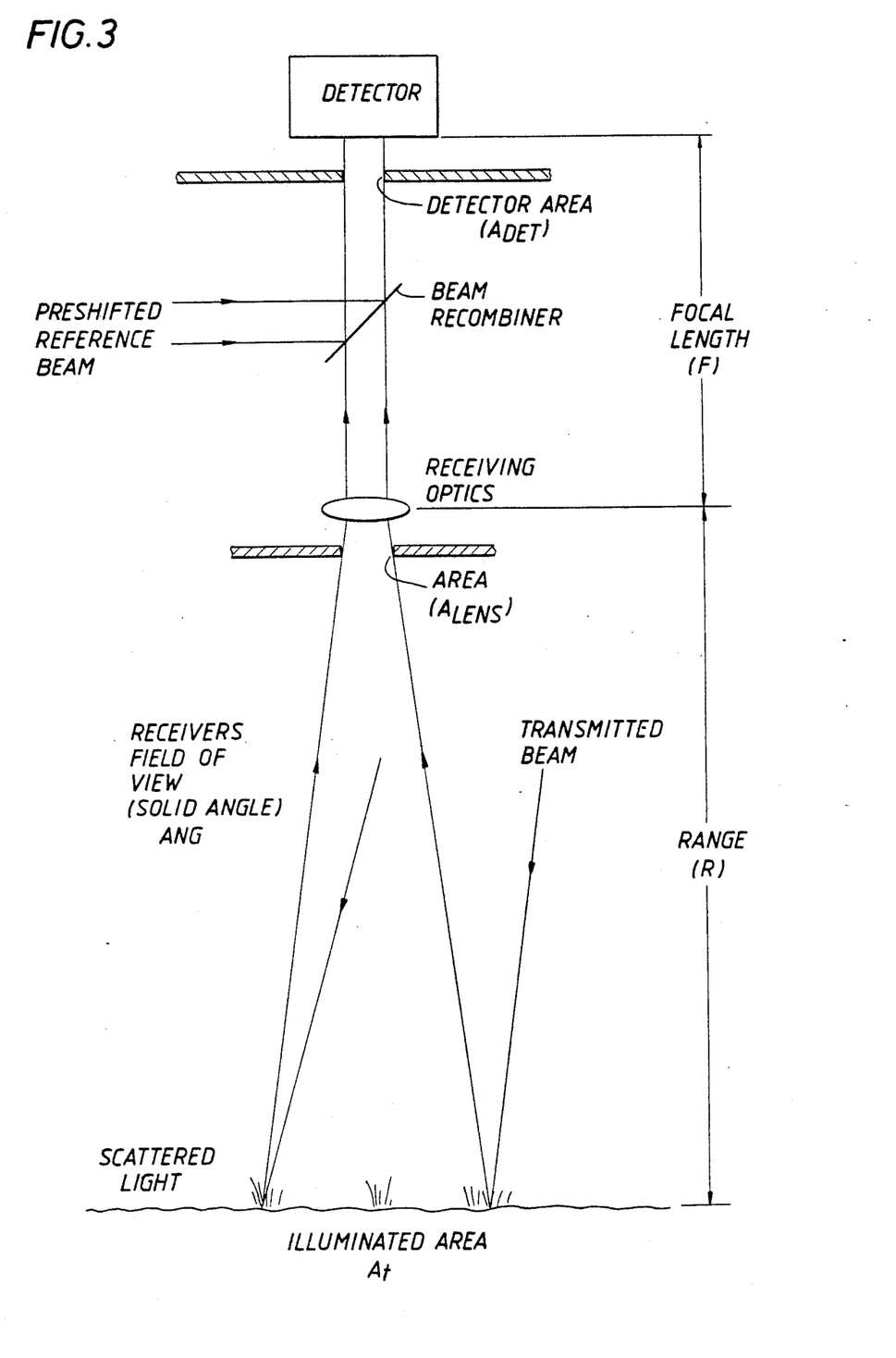
FIG. 3 depicts a single detector geometry for a laser doppler interferometer as employed by the present invention.

FIG. 3 illustrates the general geometry of the remote sensing heterodyne problem for the parallel sensing beams configuration (rather than the coaxial sensing beams configuration). The laser (not shown) illuminates a target of circular area. Both the transmitted and reflected sensing beam have the same solid angle (Ang) for the field of view, $$Ang = A_t/R^2 \text{ steradians,} \tag{13}$$

where, $A_t$ is the illuminated ground area, usually at least several cm$^2$, and R is the air to ground range, approximately 1000 m.

The ground is considered rough so that the incident laser beam's intensity is scattered isotropically in the half-space. Therefore the ratio of reflected intensity ($I_{ref}$) to incident intensity ($I_{inc}$) is, $$I_{ref}/I_{inc} = R_F(Ang/2\pi)e^{-KR}, \tag{14}$$

where, $R_F$ is the reflectance of the surface, which ranges from 0.05 to 0.15 for visible light and from 0.02 to 0.12 for infrared, and K is the extinction coefficient for signal loss due to the combined effect of atmospheric absorption and scattering during propagation. For typical clear conditions (10 Km visibility), representative values of K are 0.43/Km for visible light and 0.02/Km for infrared radiation.

The incident light's intensity is a function of the laser's power, the size of the illuminated ground spot and an exponential term representing atmospheric transmissivity, $$I_{inc} = P_{tm}e^{-KR}(A_t)^{-1}, \tag{15}$$

where, $P_{tm}$ is the transmitted laser power.

The received light intensity, $I_{rec}$, equals the scattered light intensity after a propagation loss, $$I_{rec} = I_{ref}e^{-KR}. \tag{16}$$

Atmospheric transmissivity differs significantly for visible and infrared radiation. Clear air propagation losses over a two Km pathlength are 3.7 db for visible light but less than 0.2 db for infrared. Haze (visibility 1 Km) cause propagation losses to be 37 db and 1.8 db for visible light and infrared, respectively. For moderate foggy conditions (visibility 100 m) visible light would be completely obscured but infrared radiation would only be attenuated by 18 db.

The received power ($P_{rec}$) of the carrier signal generated by the optical heterodyne receiver is the product of $I_{rec}$ and the effective lens area ($A_{eff}$), $$P_{rec} = I_{rec}A_{eff}. \tag{17}$$

The effective aperture, $A_{eff}$, is limited by the fundamental theorem of antennas, which states that the product of beamwidth and aperture equals the wavelength squared. This statement simply means that a large antenna is also highly directive. For an optical or near optical system, the beamwidth is just the solid angle of the field of view (equation 13), giving, $$A_{eff}Ang = W_1^2 \tag{18}$$

where, $W_1$ is the wavelength, which is, for example, 0.51 microns for the visible laser and 10.6 microns for infrared.

Using an aperture larger than $A_{eff}$ causes the signals received across the lens to combine destructively. This limitation on the lens area is severe at optical wavelengths. For example, to illuminate a ground spot of 1 m$^2$ from a height of 1000 m, the receiver lens is limited to a diameter of only about 0.057 cm for a visible laser and about 1.12 cm for an infrared laser. Every doubling of the area of the ground spot requires a halving of the lens area, which costs 3 db in received signal power. Because of this limitation, multiple beams are preferably used to sample the ground. Thus, each sampling beam replaces a geophone in the conventional acquisition system and then many such beams are used to form a single seismic receiver station, i.e., a single channel. Thus, the individual sampling beams (that replace the conventional, individual geophones) generate a group of recovered seismic signals that are then combined.

However, an enlarged spot may also be employed in the methods and apparatus of the present invention. While the spot size on the ground is limited by CNR factors (as described herein), the spot should be as large as possible given the foregoing limitations. Enlarged spot detection has two possible advantages over single "point" detection. More particularly, the interferometric mixing signal strength may be less sensitive to random target reflectivity vibrations and random beam disturbances (interruptions, deflections, etc.) and thus provide a signal of more or less constant strength. Further, for an extended spot the seismic velocity signal may be less vulnerable to random motions of seismic or non-seismic origin at independent points in the area of the spot.

A consequence of the limitation imposed by the antenna theorem is that keeping the same spot size while doubling the range, R, allows a four-fold increase of lens area, thus compensating for the additional spreading loss. Except for atmospheric transmission losses, a simple heterodyne receiver's carrier power is constant with range provided that a sufficiently large and accurate lens can be fabricated. Appropriately, combining the previous equations (13, 14, 15, 16, 17 and 18) gives the received power, $P_{rec}$, $$P_{rec} = P_{tm}R_fW_1{}^2 e^{-2KR}(2\pi A_l)^{-1}. \qquad (19)$$

The CNR for a heterodyne receiver is given by, $$CNR = N_u P_{rec}/(H_p F_{opt} BW), \qquad (20)$$

where, $N_u$ is the quantum efficiency, for which a value of 0.3 or larger can be obtained if the best photosensitive material is used for the particular wavelength of the laser employed; $H_p$ is Plank's constant, $6.63 \times 10^{-34}$ Joule-secs; $F_{opt}$ is the center frequency of the illuminating radiation beam ($5.8 \times 10^{14}$ for the visible light example, and $2.8 \times 10^{13}$ for infrared) and BW is the bandwidth of the receiver (400 Khz for visible light and 20 Khz for infrared).

In choosing the receiver bandwidth, BW, the doppler frequency modulation for unwanted motions, as well as seismically induced motions should be considered. Values of 400 Khz for visible light and 20 Khz for infrared are compatible choices because a given target velocity causes a doppler shift twenty times greater at visible light wavelengths than at infrared wavelengths. These bandwidth choices will accommodate a ground velocity of 10 cm/sec, a value sufficient for most seismic particle velocities, but perhaps not for any unwanted platform motion. Large unwanted platform motions may have to be removed by a frequency tracking loop that senses and removes the doppler shifts of such unwanted motions.

The relative strength of the laser and any background radiation is considered next. For a visible light laser system, reflected solar radiation is the largest interference, while for infrared radiation the earth acts as the principle source of competing radiation. One way to assess the relative strength of the laser and solar background radiation is to calculate the ratio of light intensities on the ground. Equation 15 gives the intensity of the laser radiation. The strength of the background radiation ($I_{bck}$) must be calculated in the frequency band, or equivalently the sensitive linewidth, of the receiver, $$I_{bck} = H_{bck} W_{del}. \qquad (21)$$

where, $H_{bck}$ is the background irradiance spectrum, where a value of 0.15 watts/cm²-micron represents solar radiation in the visible band, and $W_{del}$ is the linewidth of the receiver, in microns.

The effective linewidth is related to the receiver's bandwidth, as follows, $$W_{del} = BWW_1{}^2/c \qquad (22)$$

A receiver bandwidth of 400 Khz converts to a linewidth of only $0.34 \times 10^{-9}$ microns so the effective solar intensity is a minuscule $5 \times 10^{-11}$ watts/cm². Similar calculations for the infrared case also indicate that background radiation is not a problem.

The preceding analysis provides an estimate of the optical receiver's carrier to noise ratio (CNR). However, in general a CNR of at least 10 is needed for successful recovery of any frequency modulated signal.

Using this value and the other parameters given hereinbefore the laser power needed to replace a single geophone may be calculated. More specifically, for a spot size of one square meter, equation 19 is used to give the following laser power, P, requirements for visible light and infrared lasers, $$P = 750 \text{ watts for visible wavelength, and} \qquad (21)$$
$$= .1 \text{ watts for infrared.} \qquad (22)$$

These values correspond to ground illumination intensities of 75 mw/cm² and 0.01 mw/cm² respectively. Note that the visible light laser power would be much higher than permissible for eye safety considerations but the infrared laser power would be quite safe.

Using 100 geophones per channel and 225 channels in the system gives an overall power requirement of 2.25 Kw for the infrared case. This is indeed a powerful laser but it is feasible, since power efficiencies of 10-15% have been reported for Carbon Dioxide lasers. The system power needed for the visible light laser would be prohibitively high as well as being dangerous from an eye hazard standpoint.

The required power is proportional to the ground spot area. Illuminating 0.1 cm² instead of 1 cm² reduces the system power to only 225 watts. The intensity of the radiation would still be 0.01 mw/cm². Using smaller spots may have some deleterious effects, e.g., a very narrow beam may be more susceptible to movement of foliage. In particular, if a narrow focused beam should undergo a small angular shift or if the foliage (tree leaves or grass) under a narrow beam moves, then the sensing beam "sees" very different reflecting points from moment to moment; for example, in one moment a tree leaf is the reflecting point and in the next moment the earth's surface is the reflecting point. This "dancing" of the beam spot across the ground's surface and/or foliage will cause unwanted AM and FM of the signal. A larger spot is less susceptible to such "dancing" since a larger percentage of the sensing area remains in the spot for any such motions.

These calculations and the discussion hereinabove are for the most difficult case of natural surface reflectance. Using retroreflectors would provide a stronger and less complicated return signal so laser power requirements would accordingly decrease. Such a retroreflector may be a corner cube reflector to avoid mirror alignment problems. The use of reflective surfaces appropriately coupled to the surface of the earth for detection of earth motions are also contemplated and considered part of the present invention. Similarly, "inertial" reflective surfaces (i.e., vibrationally isolated from any earth motions) may also be located at the surface of the earth and employed by the apparatus and methods of the present invention.

Referring now to FIG. 4, the details of parts of the system of the present invention are described hereinbelow. For any laser employed in the apparatus or methods of the present invention, the laser's amplitude and frequency noise spectra should be (for all sensing beam path lengths if the reference beam is not "delayed") such as to create as small a heterodyne linewidth as possible and in the seismic window (0-100 Hz) have as small a noise level as possible. The laser output is determined by the foregoing calculations and the quality of the optics used for the system of the present invention. Further, the doppler determining laser may be AM modulated for making time-of-flight determinations. Alternatively, a separate laser may be employed for time-of-flight determinations; the use of two lasers for doppler and time-of-flight measurements may be as taught, for example, in U.S. Pat. No. 4,818,100 to Breen.

A variable beam splitter may be used to split the laser beam into a reference beam and a sensing beam, with a variable intensity ratio. The reference beam may be passed through an optical delay line and then preshifted in frequency by a Bragg cell (or any other appropriate opto-acoustic coupler), or the delay line and Bragg cell sequence may be reversed. To suppress unwanted stray light in the Bragg cell, the reference beam may be spatially filtered (i.e., focused by appropriate optics and sent through a small aperture). Appropriate mirrors and optics (a lens or combinations of lenses) may be employed to adjust beam direction, divergence, and/or diameter of either the reference or sensing beam, or both. A polarizer may be employed to ensure that only the appropriate polarization of the reference beam is transmitted to a beam generating device. The beam generating device converts a single beam into a plurality of beams corresponding to the plurality of sensing beams to be generated, as noted later herein. Alternatively, the reference beam may be adjusted to a large enough diameter to effectively provide the requisite number of reference beams at the beam recombining device if a single detector surface is masked at non-detector locations between recombining positions, or an array of detectors is employed. Appropriate optics cause the reference beams to be imaged onto a beam recombining device, where they recombine with appropriate sensing beams and then the interferences of the mixed beams are detected by appropriate detectors.

The sensing beam may be optionally preshifted in frequency by a Bragg cell and appropriately filtered by a polarizer, if desired. The sensing beam then passes to a beam generating device which converts the single beam into a plurality of beams, which via a beam control and steering device are directed at appropriate detector locations. The reflected radiation beams form the signal beams.

When a coaxial configuration for the outgoing sensing beam and the reflected sensing beam is used, then the same optics are used to receive as well as send the sensing beam (as shown in FIG. 4) and a polarizing beam splitter may be used to separate the reflected signal beam from the outgoing sensing beam. For this case, the outgoing sensing beam has its polarization adjusted to be horizontal (for example) so as to pass through the polarizing beam splitter, after which it is passed through a quarter-wave plate. The reflected signal beam also passes through the quarter-wave plate and is accordingly adjusted to vertical polarization. On hitting the polarizing beam splitter the vertically polarized signal beam is reflected into the recombining optics. However, such polarization adjustments may not be necessary when natural reflection is employed due to the low power of the reflected signal beam and its inability to "interfere" with the laser's operation.

Alternatively, and as presently preferred in the methods and apparatus of the present invention, a parallel outgoing sensing beam and reflected sensing beam configuration are employed, i.e., one set of optics is used to send the sensing beam to the target and a second set of optics is used to receive the reflected sensing beam. For this presently preferred case, no polarization adjustments are needed.

At a beam recombining device, such as a combining beam-splitter, the beams (signal and reference) are brought to coincidence and combined and then image an appropriate detector, where the actual interferometric mixing occurs. The detector's output is amplified and filtered and passed onto demodulation circuitry. The demodulated signal may then be low-pass filtered to isolate the signal of interest from unwanted signals and/or noise.

The demodulation circuitry may be a conventional FM demodulator. The detector may be any conventional optical detector, such as a photomultiplier, photodiodes, or any other type of photodetector. For the sensing beam, the beam generating device may be a plurality of parallel "telescopes" each directed at their respective target area of the earth (via an appropriate beam steering and control device) and all simultaneously illuminated by an optically enlarged sensing beam from a laser; any other type of device for generating multiple beams from a single beam may be employed in the present invention. One such device is a combination of multiple beam splitters in series and parallel.

There are several ways to eliminate any unwanted doppler associated with vibrations of the laser platform of the airborne system of the present invention. One way is to reflect radiation off a reflective inertial element mounted on the ground. A simple example of such a reflective inertial element would be a retroreflector mounted on the non-moving (inertial) part of a geophone.

Figure 5:
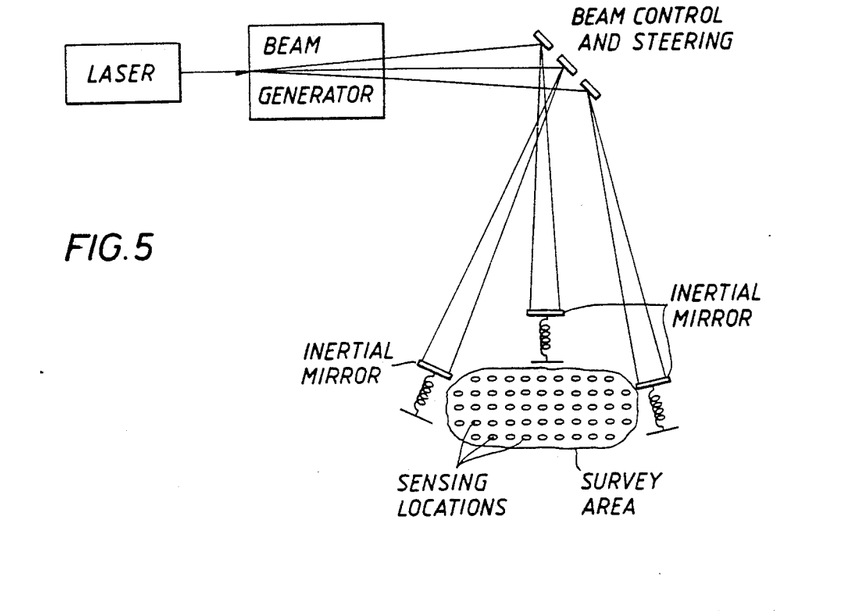
FIG. 5 depicts the arrangement of three spatially dispersed inertial mirrors on the surface of the earth used to measure any doppler associated with an airborne laser platform.

If three such "inertial mirrors" were planted at widely displaced points in the survey area as shown in FIG. 5, the laser system could simultaneously generate a signal $V_d(t)$ for each of these inertial points, as well as for the other detector ground points. The signals from such inertial points would contain three dimensional doppler representing platform motion, but would contain no seismic motion. It should be possible to calculate the effective platform doppler in any direction from the projection of the measured signals along a desired direction, given the relative physical positions of the three inertial mirrors and the platform. The estimated platform doppler would then be subtracted from the recovered doppler signal ($DISC_{out}$). The positions of the three inertial mirrors could also serve as survey reference points for locating sensing positions and orienting all sensing beams.

Figure 6:
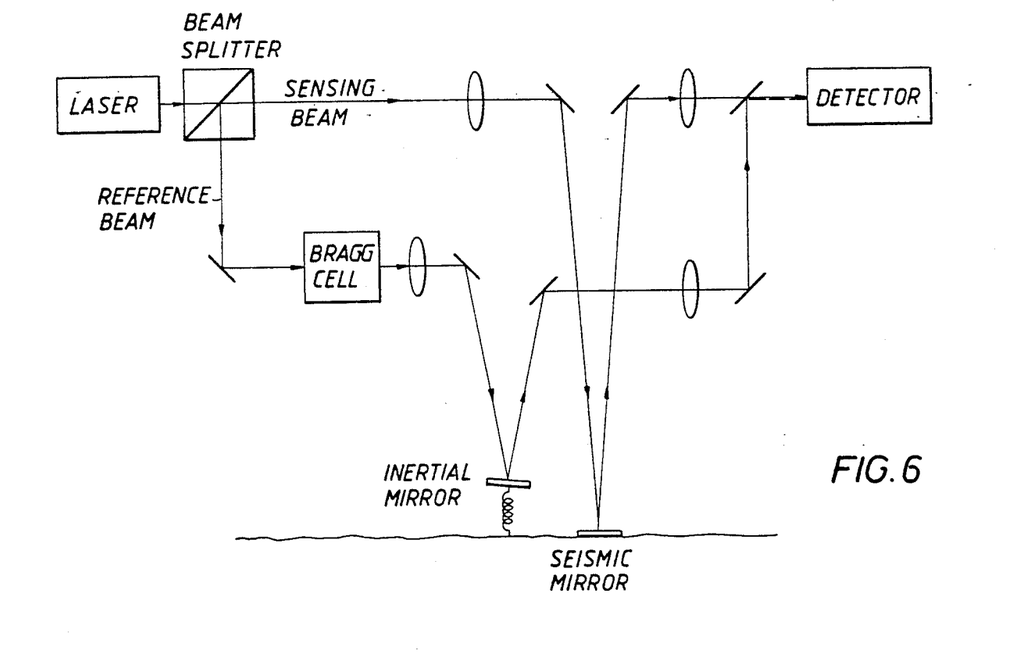
FIG. 6 depicts the arrangement of a separate inertial mirror and ground motion mirror to measure both laser platform and earth motion doppler using a single laser.

Another alternative is to mount an inertial retroreflector and use either natural surface reflection, or if necessary, a seismically active retroreflector at every desired ground detection position, as shown in FIG. 6. The methods and apparatus of the present invention contemplate and include the transmission of both the sensing and reference beam of a single laser to the ground and reflecting the reference beam from an inertial mirror to impose any platform motion on it. The inertial mirror is illuminated by the reference beam while the seismically active mirror is illuminated by the sensing beam. The reference beam may be one or many beams. This may be accomplished by physically separating the two mirrors and directing the appropriate beam at them, or by "tuning" the appropriate mirror to the frequency of the correct beam. Any doppler associated with platform motion is common to both beams so the difference frequency should contain little or no platform doppler.

Figure 7:
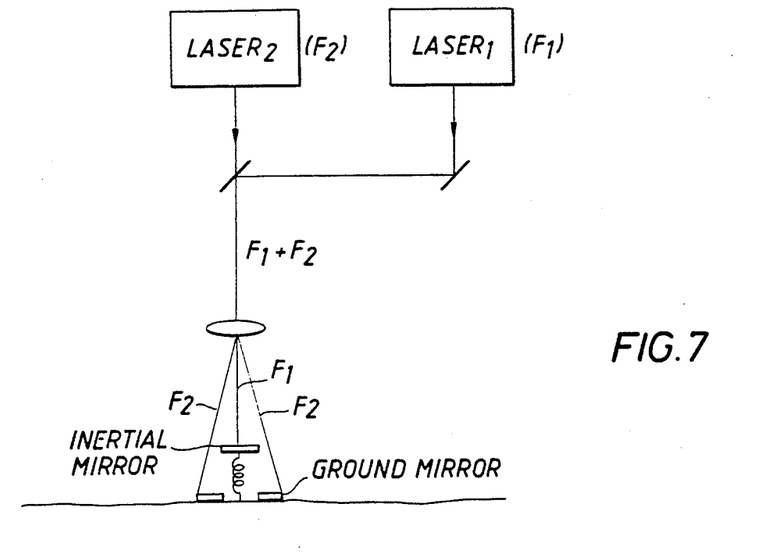
FIG. 7 depicts the arrangement of sending two beams from two lasers to an earth location having both an inertial and earth motion mirror to measure both laser platform and earth motion doppler.

A similar, alternative method is to employ two lasers as a "source" and send both their sensing beams to the earth, with one beam reflecting from an inertial mirror and the other beam reflecting from a seismically active mirror (mounted on or in the earth), or directly from the earth's surface. Each sensing beam has its own local reference beam with which it is heterodyned and the two resulting signals are also heterodyned to removed any platform noise common to both laser's sensing beams. FIG. 7 depicts one arrangment of an inertial mirror and a seismically active mirror mounted at one earth location. For this case the two lasers use the same optics for sending the sensing beams to the earth and one mirror may be highly reflective for the frequency of one beam but not the other beam, while the other mirror is highly reflective for the other beam's frequency. Thus, one beam senses the earth's motion and the other beam senses the inertial mirror (i.e., no earth motion). Alternatively, this can also be accomplished by "tuning" the inertial mirror to be most reflective at the frequency of one of the beams and not employing a seismically active mirror. It should be clear that the use of two sensing beams from two separate lasers and frequency differencing their two reflected sensing beams is also a part of the present invention.

Alternatively, the inertial mirror may be mounted on the platform and vibrationally isolated therefrom. However, as noted hereinbefore, having the inertial mirror on the ground also has other advantages. More particularly, if both beams are close together or coaxial, they will experience the same turbulence, and have a common phase scintillation (which is a deleterious effect) which is removed by forming the difference frequency using heterodyning techniques. Further, the raypath lengths both beams are nearly the same which reduces or eliminates the effect (if any) of laser frequency instability or other delay dependent noises, which were discussed earlier herein.

It may be possible to use these two schemes with an inertial mirror mounted on the platform of the airborne system. For this case, the reference beam may be appropriately delayed by a delay line. There is also the possibility of direct platform stabilization by known mechanical methods (springs and mass dampening), which is probably desirable but unlikely to be sufficient by itself.

Almost all land seismic data is collected by recording only the vertical component of motion, while marine seismic data is collected by recording pressures resulting from movements of the seismic waves through the water. However, horizontal particle velocities are recorded for shear wave surveys when the source causes horizontal vibrations. Some seismic surveys have recorded all three components of seismic motion. This technique would be used more often but it triples the number of channels. Use of the airborne laser system of the present invention can provide the large numbers of channels needed to easily effect such a three component acquisition. A method of the present invention allows for simultaneous recording of all three components of seismic motions for such a purpose. This method is briefly described hereinbelow.

Figure 8:
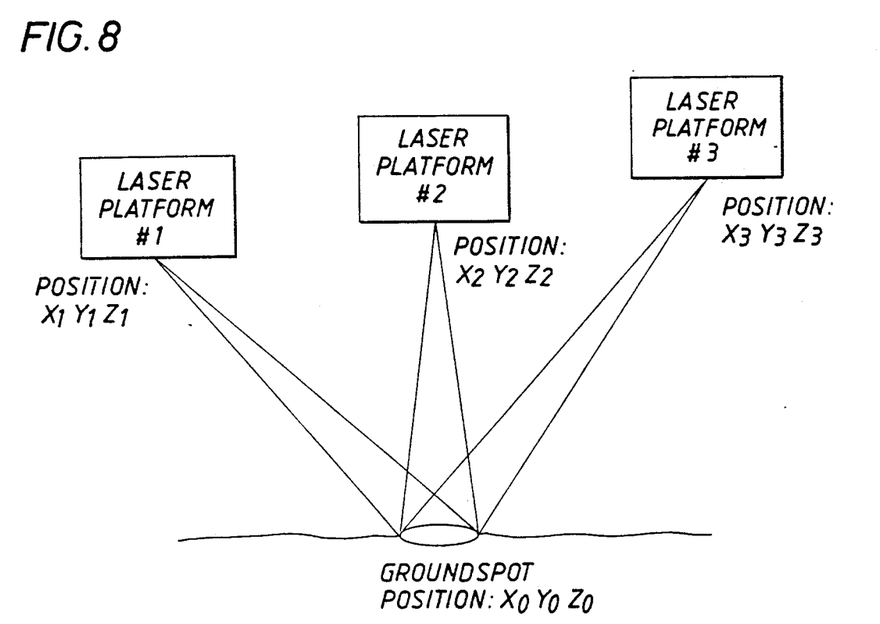
FIG. 8 depicts the arrangement of three spatially dispersed laser platforms to detect three components of the earth motion at a detecting location on the earth.

Laser reflections allow determination of the relative particle velocity along the line connecting laser and ground point. Consider the case of three physically dispersed laser platforms each illuminating the same ground point, as shown in FIG. 8. Three projections of the particle velocity are thus obtained. If these projections sufficiently span the real space then the equivalent of conventional three component recording is accomplished. Thus, a method of the present invention illuminates each position of the earth where three component seismic signals are desired to be sensed with electromagnetic radiation from three spatially dispersed sources. The reflected radiation from each position and source are appropriately detected and analyzed as described hereinbefore.

Figure 9:
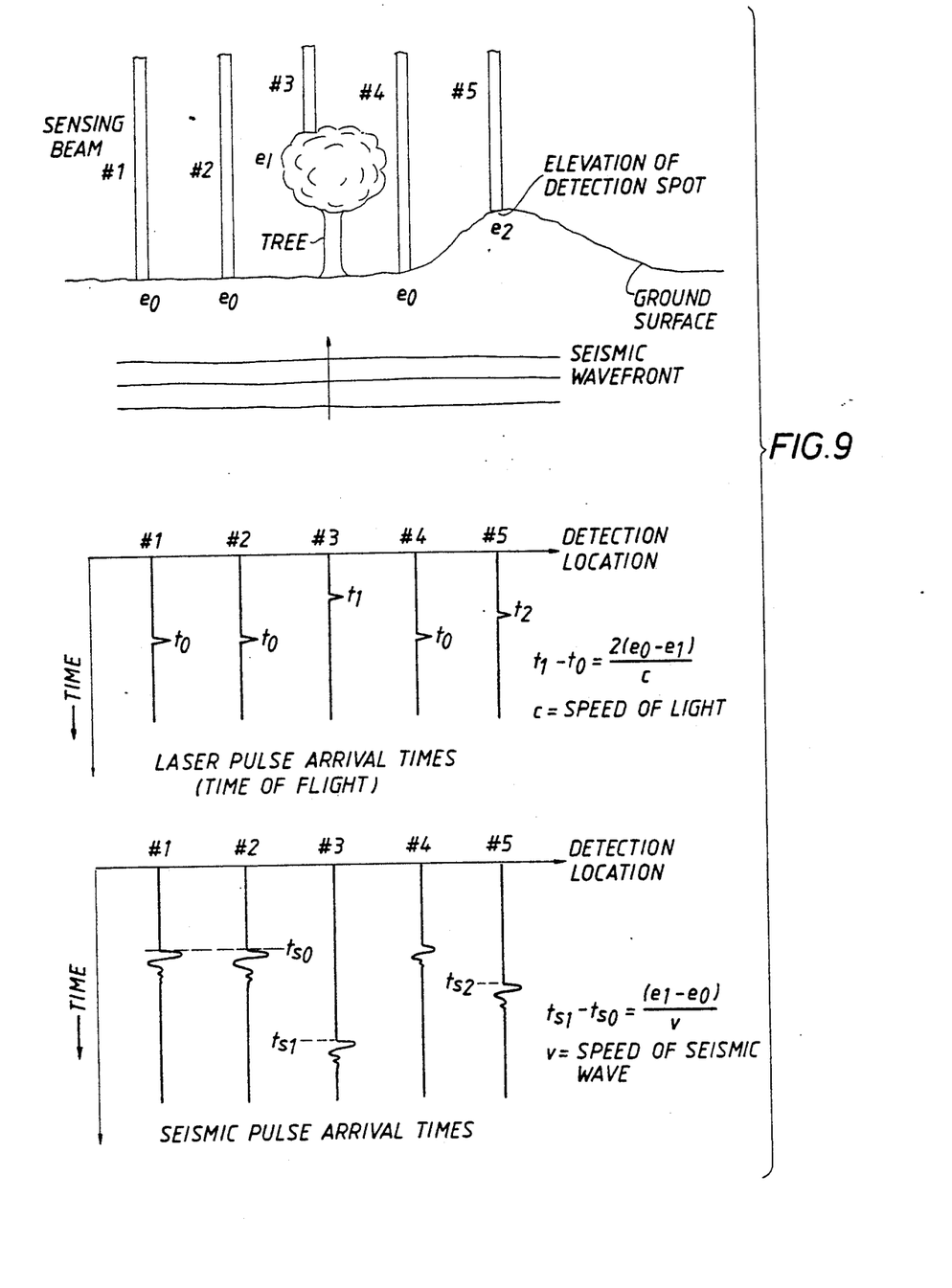
FIG. 9 depicts the use of laser beams to also detect elevation at seismic detecting locations on the earth.

In addition to determining seismic velocity motion, the same laser used for doppler may be employed to determine ranges to each detector location, or a separate laser may be employed. In this manner the "elevation" of each detector location (as shown in FIG. 9) may be determined and employed in later processing steps. As noted hereinbefore, this may be accomplished by appropriate AM of the same laser beam employed to detect doppler shifts. Alternatively, a separate laser may be employed to generate such elevation data; this separate laser preferably uses the same optics for transmission and reception of its laser beam as the laser for doppler detection; see, for example, U.S. Pat. No. 4,818,100.

FIG. 9 depicts the effect of unequal detector location heights on both the laser time-of-flight measurements and the arrival of a seismic wave at the sensing height. In particular, FIG. 9 depicts the illumination of five examples of detector locations having a variety of elevations. As the elevation increases, the time-of-flight measurement decreases; this is seen by comparing the time-of-flight measurements of positions 1, 2, and 4 with those of positions 5 and 3. These measurements differ according to the differences in elevation; the time of "delay" is equal to twice the elevation difference divided by the speed of light. For position 3, for a 15 m elevation, this results in a 0.1 microsec "earlier" arrival time of reflected laser radiation compared to the arrival times at positions 1, 2, and 4.

Similarly, FIG. 9 also depicts the later arrival of the seismic wavefront at the higher elevation sensing locations. For this case, the difference in arrival time is equal to the elevation difference divided by the speed of the seismic wave. Further, it is possible to compensate for these differential elevation effects (time-of-flight and seismic wave arrival times) without actually determining the elevation. This allows for a "static" correction to be made to the seismic data to place all the data at the same detector elevation.

As noted earlier herein, it is one embodiment of the present invention to locate the laser and its associated power source and cooling system on a mobile ground vehicle. For this case, the laser beam is sent to the airborne platform (containing the remainder of the components discussed earlier herein) as a highly collimated and intense beam. For the example of FIG. 4, the laser would be located on the earth with the remainder of the system on the airborne platform and with appropriate additional optics (not shown in FIG. 4) between the laser on the ground and the beam splitter on the platform. Alternatively, other portions of the system may also be located at the earth's surface, but in any event the beam control and steering portion of the system should remain airborne.

Although eye safety considerations are important, there may be applications of the methods and apparatus of the present invention where eye safety considerations may be ignored. Although the foregoing discussion has, in general, been in terms of seismic reflection surveying, the methods and apparatus of the present invention may also be employed for detecting refracted seismic waves as well as naturally occurring seismic waves. Although the foregoing discussion has, in general, been in terms of a CW laser, a pulsed laser may also be employed and is contemplated as part of the present invention. In addition, although the foregoing discussion has, in general, been in terms of land seismic surveying, there may be specific marine applications suitable for application of the methods and apparatus of the present invention. Further, although the foregoing discussion has, in general, been in terms of a seismic bandwidth of 10-80 Hz, other appropriate bandwidths (such as for example, but not limited to 0-100 Hz) may be employed and are contemplated as part of the present invention.

Many other variations and modifications may be made in the apparatus and techniques hereinbefore described, by those having experience in this technology, without departing from the concepts of the present invention. Accordingly, it should be clearly understood that the apparatus and methods depicted in the accompanying drawings and referenced in the foregoing description are illustrative only and are not intended as limitations on the scope of the invention.

What is claimed is:

1. Apparatus for remotely measuring seismic signals at the surface of the earth, comprising:
   a laser for producing a laser beam of substantially monochromatic frequency,
   a beam splitter for splitting the laser beam into a sensing beam and a reference beam,
   an optical modulator for changing the frequency of the reference beam to produce a predetermined frequency offset between the frequency of the sensing beam and the frequency of the reference beam,
   a beam generating device for generating a preselected number of parallel sensing beams,
   a beam control and steering device for individually directing each of the parallel sensing beams to preselected locations on the earth's surface,
   a beam combining device located to intercept each reflected sensing beam and each reference beam and to individually combine an appropriate sensing and reference beam,
   an imaging device for imaging said combined beams onto a detection plane,
   a detector located at said detection plane for producing, at a frequency equal to the predetermined frequency offset, an individual beat signal varying in accordance with variations in the interference resulting from individually combining respective sensing and reference beams, and
   means electrically connected to said detector for processing each individual beat signal to measure variations in its phase or amplitude and determined seismic signals therefrom.

2. The apparatus of claim 1, further comprising:
   a delay line for delaying the reference beam a preselected amount of time.

3. The apparatus of claim 1, further comprising:
   a second beam generating device for receiving the reference beam and generating a preselected number of parallel reference beams.

4. The apparatus of claim 1, further comprising:
   means for amplitude modulating said laser beam.

5. The apparatus of claim 4, further comprising:
   means for determining time-of-flight measurements from said amplitude modulated laser beam.

6. The apparatus of claim 1, further comprising:
   a second laser for producing a second laser beam of substantially a second monochromatic frequency.

7. The apparatus of claim 6, further comprising:
   means for modulating said second laser beam.

8. The apparatus of claim 7, further comprising:
   means for determining time-of-flight measurements from said modulated laser beam.

9. The apparatus of claim 1, further comprising:
   means for recording said determined seismic signals.

* * * * *

UNITED STATES PATENT AND TRADEMARK OFFICE
CERTIFICATE OF CORRECTION

PATENT NO. : 5,070,483
DATED : December 3, 1991
INVENTOR(S) : Albert J. Berni

It is certified that error appears in the above-indentified patent and that said Letters Patent is hereby corrected as shown below:

On the Title page, item [75], inventors: should be --Albert J. Berni, Houston, Tex.; Willem Lodwijk scheen; Arnoldus Maria Michels; Philippus de Bree, and; Willem Hartemink, all of Rigswijk, Netherlands.

Signed and Sealed this

Eleventh Day of October, 1994

Attest:

BRUCE LEHMAN

*Attesting Officer*        *Commissioner of Patents and Trademarks*